United States Patent

[11] 3,555,361

[72] Inventor Frederick C. Hallberg
 Wheaton, Md.
[21] Appl. No. 789,043
[22] Filed Dec. 31, 1968
[45] Patented Jan. 12, 1971
[73] Assignee The United States of America as represented by the Administrator of the National Aeronautics and Space Administration

[54] TURN ON TRANSIENT LIMITER
 7 Claims, 3 Drawing Figs.
[52] U.S. Cl. .................................................. 317/20, 317/33
[51] Int. Cl. .................................................. H02h 9/00
[50] Field of Search .................................................. 317/20; 200/144APRF; 318/16, 17, 18

[56] References Cited
UNITED STATES PATENTS
3,299,347 1/1967 Torii .................................................. 323/97

Primary Examiner—J. D. Miller
Assistant Examiner—Harry E. Moose, Jr.
Attorneys—R. F. Kempf, E. Levy and G. T. McCoy ABSTRACT: This disclosure describes a turn on current transient limiter that controls the peak current that can flow into a high capacity load when voltage is initially applied to the load. A plurality of silicon controlled rectifier (SCR) circuits are connected in a parallel arrangement with the parallel arrangement being connected in series with the load. All of the SCR circuits except the last one, include current limiting means. The SCR circuits are sequentially switched "on" when voltage is initially applied and limit current until the last one is switched "on" at which time current transients have dropped below a predetermined level.

INVENTOR
FREDERICK C. HALLBERG

BY

ATTORNEYS

INVENTOR
FREDERICK C. HALLBERG

TURN ON TRANSIENT LIMITER

BACKGROUND OF THE INVENTION

It is well known that high current transients occur when a voltage is initially applied to a load, particularly a high capacity load. It is also well known that high current transients can have a disabling or destructive effect on some loads. For example, turn on high current transients can ruin slip rings. In addition, high current transients that occur when a voltage is initially applied to a load can have a detrimental effect on other loads connected to a common power source. Hence, it is desirable to provide an apparatus for limiting the current transients that occur when a voltage is initially applied to a load. However, while it is desirable to limit current transients, it is not desirable to provide a system that continues to limit current after the transients have ended.

The prior art has attempted to solve the current transient problem by the use of chokes, resistors, or single series connected emitter follower transistor circuits. However, none of these systems have been entirely satisfactory in reducing turn on current transients to desirable limits, particularly when the load is a high capacity load. The disadvantage of a choke is that it raises the voltage source impedance and is not effective when large load capacities are involved since the choke may saturate before the load capacitor is completely charged and thus lose its effectiveness. Resistors have the disadvantage that they continue to offer a voltage drop to the load circuit after the transients have ended. A single transistor slow turn on device cannot provide a long enough time to limit the transient currents that occur in high capacity loads. In addition, series connected emitter follower transistors have about a 0.5 voltage drop across the series connected terminals and, hence, in some circuits undesirably reduce the voltage to the load and the overall system.

Therefore, it is an object of this invention to provide a new and improved turn on current transient limiter.

It is a further object of this invention to provide a new and improved turn on current transient limiter that is suitable for use with loads having high input capacities.

It is a still further object of this invention to provide a new and improved turn on current transient limiter that limits current during the initial application of voltage to the load while not unduly lowering the voltage to the overall system after current transients have ended.

It is yet another object of this invention to provide a turn on current transient limiter that prevents turn on current transients from having a detrimental effect on other loads connected to a common voltage source.

SUMMARY OF THE INVENTION

In accordance with a principle of this invention, a turn on current transient limiter that controls the peak current that can flow into a load when voltage is initially applied to the load is provided. A plurality of switching circuits are connected in a parallel arrangement with the parallel arrangement being connected in series with the load. The switches are sequentially switched "on" in an automatic manner when voltage is initially applied so as to limit the current applied to the load until the current transients have dropped below a predetermined level.

In accordance with a still further principle of this invention, the switches are preferably silicon controlled rectifiers (SCR's) and the last SCR circuit does not include a current limiting means; hence, current limiting is ended when the last SCR circuit is switched "on." In addition, automatic switching is provided by charging capacitors in RC circuits to control SCR turn on times.

In accordance with a still further principle of this invention, the last SCR circuit energizes a relay that connects the voltage source directly to the load to thereby eliminate all current limiting after transients have ended, including the current limiting drop that occurs across an SCR. In addition, the first circuit does not include an SCR, rather it immediately limits current without being switched into the system by an SCR.

In accordance with a still further principle of this invention, the last SCR is replaced with a transistor to provide a higher gain for the last stage of the parallel arrangement.

It will be appreciated from the foregoing description that the invention provides a turn on current transient limiter that is useful in keeping turn on transients within predetermined limits. The invention limits the turn on current transients to a specified amplitude while at the same time offering a low impedance path between the supply voltage and the load after a selected period of time has passed. The period of time being sufficiently long for transients to have dropped to a predetermined level. The invention is flexible and offers a wide range of operation by adjusting the various time constants of RC circuits and limiting the effect of the SCR circuits to control the point at which an individual circuit of the SCR arrangement is connected to the load and the amount of limiting accomplished by that circuit. The invention is compact and light in weight due to the use of semiconductor components. In addition, because the invention operates automatically, no external switching means is necessary to switch the invention in or out of the system. Finally, the invention prevents turn on current transients created by one load from having a detrimental effect on other loads connected to a common voltage source.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
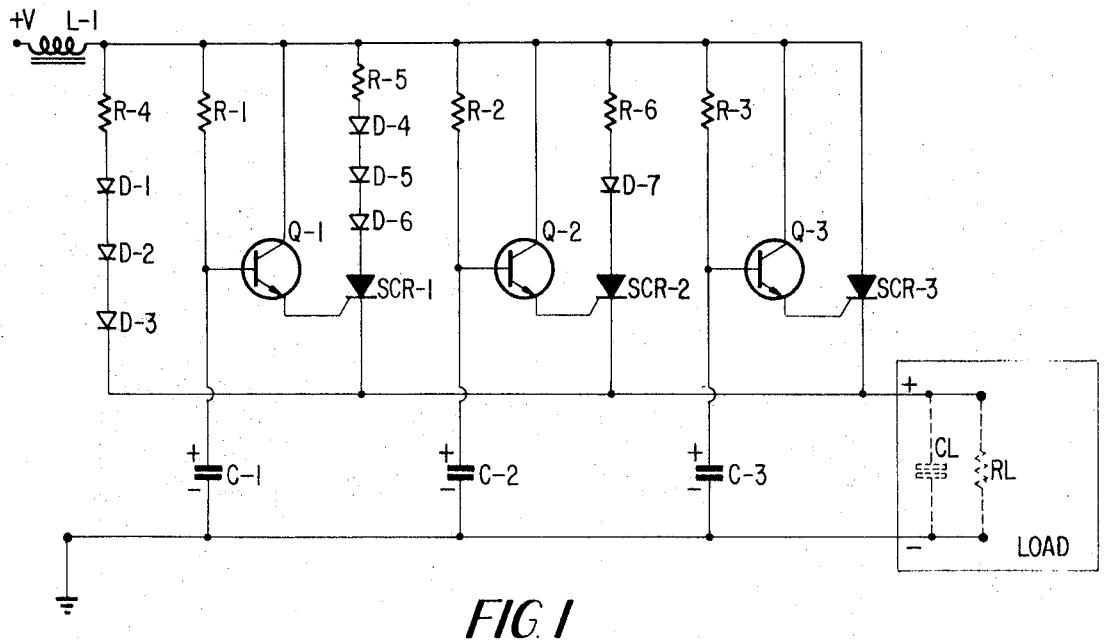
FIG. 1 is a schematic diagram of one embodiment of the invention.

FIG. 1 illustrates one embodiment of the invention and comprises: an inductor designated L1; six resistors designated R1, R2, R3, R4, R5, and R6; seven diodes designated D1, D2, D3, D4, D5, D6, and D7; three capacitors designated C1, C2, and C3; three NPN transistors designated Q1, Q2, and Q3. Also illustrated in FIG. 1 is a load capacitor CL and a load resistor RL connected across the input terminals of the load. RL and CL are dotted to illustrate that they represent the input resistance and capacitance of the load.

One end of L1 is connected to a voltage source designated +V. The other end of L1 is connected to: one end of R4; one end of R1; the collector of Q1; one end of R5; one end of R2; the collector of Q2; one end of R6; one end of R3; the collector of Q3; and, the anode of SCR 3. The other side of R4 is connected to the anode of D1. The cathode of D1 is connected to the anode of D2 and the cathode of D2 is connected to the anode of D3. The cathode of D3 is connected to the plus (+) input terminal of the load. The other end of R1 is connected through C1 to ground. The junction between R1 and C1 is connected to the base of Q1. The emitter of Q1 is connected to the gate of SCR 1.

The other end of R5 is connected to the anode of D4. The cathode of D4 is connected to the anode of D5 and the cathode of D5 is connected to the anode of D6. The cathode of D6 is connected to the anode of SCR 1. The cathode of SCR 1 is connected to the plus (+) input terminal of the load.

The other end of R2 is connected through C2 to ground. The junction between R2 and C2 is connected to the base of Q2. The emitter of Q2 is connected to the gate SCR 2. The other side of R6 is connected to the anode of D7. The cathode of D7 is connected to the anode of SCR 2. The cathode of SCR 2 is connected to the plus (+) input terminal of the load.

The other side of R3 is connected through C3 to ground. The junction between R3 and C3 is connected to the base of Q3. The emitter of Q3 is connected to the gate of SCR 3. The cathode of SCR 3 is connected to the + input terminal of the load. The minus (−) input terminal of the load is connected to ground.

R4, R5, and R6 limit the peak current that can be applied to the load from the +V source when voltage is initially applied. The time constants of: R1—C1; R2—C2; and, R3—C3, control the turn on time of SCR 1, SCR 2, and SCR 3.

Turning now to a specific description of the operation of the embodiment of the invention illustrated in FIG. 1, L1 acts as a choke, however, it is a small choke which may be of the one ohm-12 micro henry type, for example. In any event, when voltage is first applied, it flows through L1, R4, D1, D2, and D3 to the load. The current is limited by the resistance value of R4. At the same time, current flows through R1 to C1, R2 to C2, and R3 to C3 thereby charging C1, C2 and C3. The time constants of these circuits determine the charge rate. Assuming SCR 1 is to be the first SCR turned on, after a period of time, C1 charges to a value that when amplified by Q1 is sufficiently large to trigger SCR 1 "on." When this occurs, a current path is provided through R5, D4, D5, D6 and SCR 1 as well as through R4, D1, D2, and D3. Hence, an additional amount of current is applied to the load; however, during this period of time a portion of the transient has been reduced. The net result is that the current applied to the load remains within prescribed limits.

Following the foregoing operation, C2 charges to a value sufficiently high for Q2 to operate SCR 2. When this occurs, a third current path is provided through R6, D7, and SCR 2. Finally C3 charges to a sufficiently high value that, when amplified by Q3, turns SCR 3 on. Because SCR 3 does not include any limiting resistor, it carries the majority of the current, thereafter, to the load. Hence, the voltage applied to the load is only lowered by the voltage drop across SCR 3 which may be, for example, 0.8 volts.

The purpose of diodes, D1, D2, D3, D4, D5, D6, and D7 in the load charging paths is to allow sufficient voltage across each succeeding SCR for proper operation. The diodes make the voltage across the SCR's less dependent on the value of the load resistance.

It will be appreciated from the foregoing description, that the invention provides an uncomplicated, light in weight, and inexpensive system that prevents current transients from having a detrimental effect such as burning slip rings supplying power to a high capacity load. By controlling the time constants of RC circuits and the value of current limiting resistors, a switching circuit that is automatic and variable over a wide range is provided. Because it is automatic, the invention requires no external control system. And because it is variable over a wide range, it can be used with small or large transient currents. Finally, it can be used with short time transient currents or long time transient currents. Furthermore, the invention prevents current transients from having a detrimental effect on other loads connected to the voltage source supplying power to a high capacity load.

Figure 2:
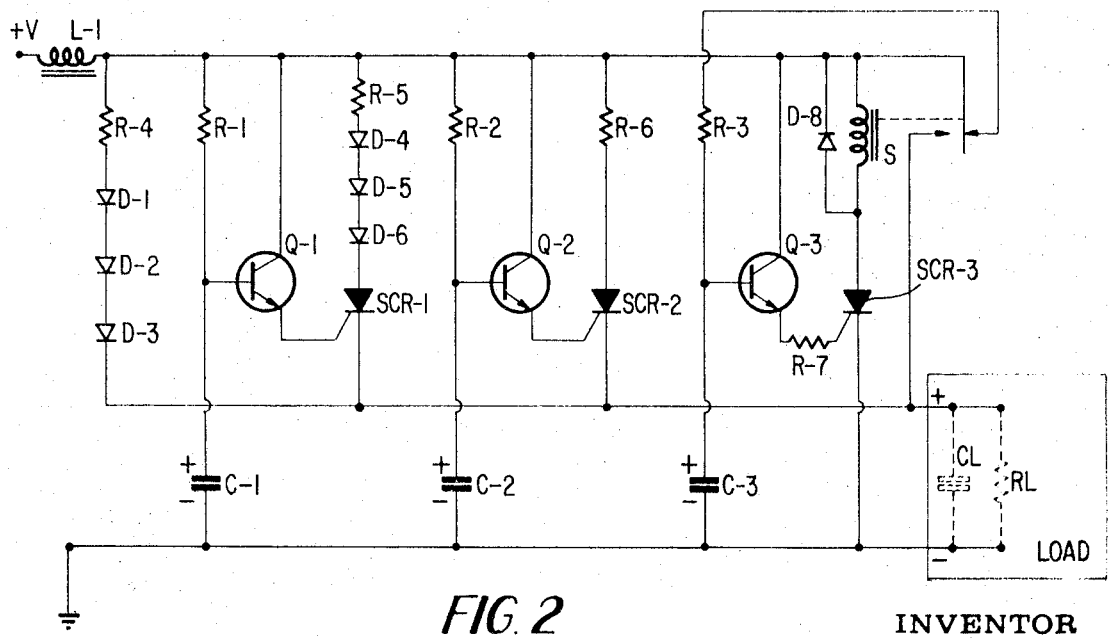
FIG. 2 is a schematic diagram of a further embodiment of the invention.

FIG. 2 illustrates an alternative embodiment of the invention which is somewhat similar to the FIG. 1 embodiment; hence, only the changes in structure and operation between the two embodiments will be hereinafter described. The primary difference between the FIG. 1 and the FIG. 2 embodiments is that the coil S of a solenoid is connected between the anode of SCR 3 and the other side of L1. An eight diode designated D8, is connected in parallel with S, with the anode of D8 being connected to the anode of D3 and the cathode of D8 being connected to the other side of L1. Diode 7 is eliminated. Further, one side of R3 is not connected to the other end of L1, rather, it is connected to the normally closed terminals of S. The normally open terminals of S are connected to the plus (+) input of the load. In addition, the cathode of SCR 3 is connected to the minus input of the load rather than the plus input. Finally, a seventh resistor designated R7 is connected between the emitter of Q3 and the gate of SCR 3.

The embodiment of the invention illustrated in FIG. 2 operates in a manner similar to the operation of the embodiment illustrated in FIG. 1 and heretofore described up to the turning on of SCR 2. Thereafter, SCR 3 is turned on when C3 charges to a sufficient voltage that when amplified by Q3 through the drop of R7 is sufficient to gate SCR 3 on. When SCR 3 is gated on, current flows through S causing the normally open contacts to close and the normally closed contacts to open. When the normally open contacts close, current flows from L1 directly to the load without passing through any SCR 3 or any other limiting drop. D8 is used to clip the overshoot from the coil of the relay when power is removed. Hence, the primary advantage of the FIG. 2 embodiment is that it eliminates any voltage drop in series between the voltage source +V and the load such as the 0.8 voltage drop across SCR 3 in the FIG. 1 embodiment.

Figure 3:
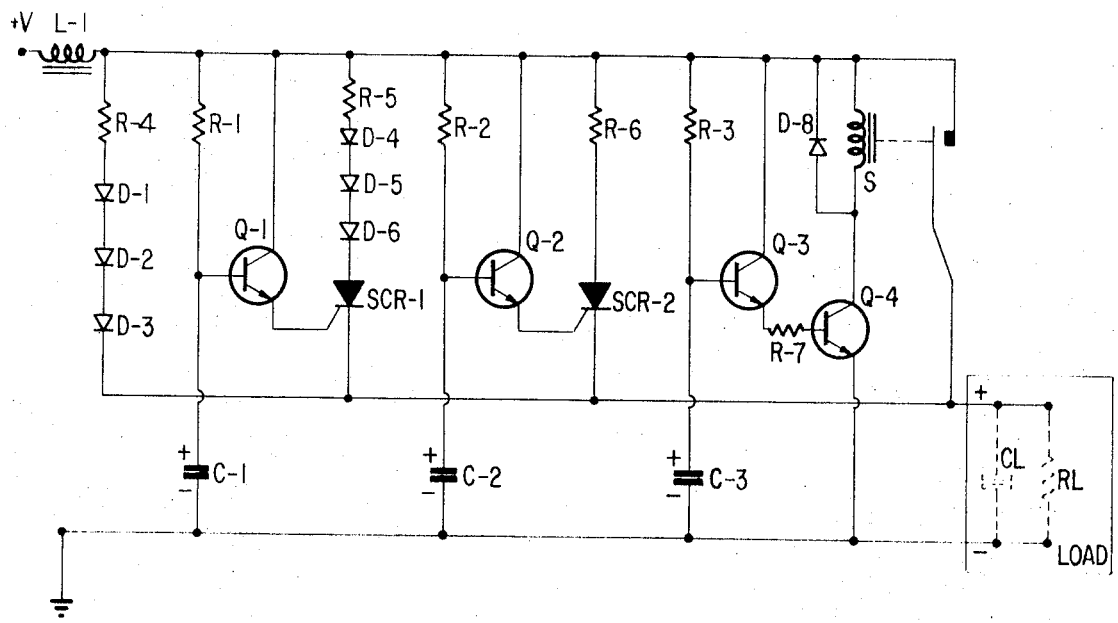
FIG. 3 is a schematic diagram of a still further embodiment of the invention.

FIG. 3 illustrates a slightly different embodiment of the invention than the FIG. 1 and FIG. 2 embodiments, specifically, FIG. 3 includes a relay coil S and diode D8 connected as in the FIG. 2 embodiment. The relay only includes normally open contacts connected between the other end of L1 and the plus input of the load. As with FIG. 1, one end of R3 is connected to the other side of L1. The primary difference between FIG. 2 and the FIG. 3 embodiments is that SCR 3 is replaced by a fourth NPN transistor designated Q4. The collector of Q4 is connected to the anode of D8 and one side of S, the base of Q4 is connected through R7 to the emitter of Q3 and the emitter of Q4 is connected to the negative side of the load.

The operation of the FIG. 3 embodiment is essentially identical to the operation of the FIG. 2 embodiment. That is, after SCR 1 and SCR 2 have been switched on, C3 charges to a value sufficiently high so that when it is amplified by Q3, it turns Q4 "on." When Q4 is turned on, a current flows through S causing the contact to close and apply current directly to the load from the source. The use of a transistor Q4 in place of an SCR increases the voltage gain across the relay coil and offers a higher gain in the last stage than prior described embodiments.

It will be appreciated from the foregoing description that a turn on current transient limiter suitable for use with high capacity loads is provided. While the invention is preferably used with high capacity loads it is useful in other environments. That is, it is useful in any environment where it is desired to limit the current transients that occur when a voltage is initially applied to a load. The invention offers a wide range of flexibility of adjustment of maximum peak current and time of completion of the direct connection between the load and the source. It is compact due to its use of solid state components and offers a savings in weight over the use of a large choke with its inherent limitations in the value of load capacity that it can handle. A further advantage of the invention resides in the provision of a very small voltage drop between the source and the load.

It will be appreciated while preferred embodiments of the invention have been heretofore described, other embodiments of the invention fall within that description. For example, the polarity of the various diodes, transistors, and SCR's can be inverted for an inverted voltage source. In addition, more or less than three parallel SCR-transistor circuits can be utilized. Hence, the invention can be practiced otherwise than as specifically described herein.

I claim:

1. A turn on current transient limiter comprising:
a plurality of switching circuits connected in parallel, each of said circuits including a switch, wherein at least two of said switches are silicon controlled rectifiers, a current limiter comprising a resistor connected in series with the switch and a control for controlling the operation of the switch, wherein in some of said switching circuits, diodes are connected between said resistor and s said silicon controlled rectifier;
a further circuit connected in parallel with said plurality of switching circuits, said further circuit including a current limiter comprising resistor; and means for connecting said plurality of switching circuits and said further circuit in series between a source and a load.

2. A turn on current limiter as claimed in claim 1 wherein said further circuit comprises:
   a resistor; and,
   a plurality of diodes connected in series with said resistor.

3. A turn on current limiter as claimed in claim 2 including a transistor amplifier in each of said plurality of switching circuits, said transistor amplifier connected between said control and said silicon controlled rectifier for amplifying the signal from said control to said silicon controlled rectifier.

4. The turn on current limiter as claimed in claim 3 wherein said control comprises a resistor-capacitor circuit adapted to charge the capacitor when power is initially applied to the circuit.

5. The turn on current limiter as claimed in claim 4 including a relay having its coil connected in circuit with the SCR in one of said plurality of switching circuits and having contacts for connection directly between a source and a load.

6. A turn on current transient limiter as claimed in claim 5 wherein one switch is a transistor switch, said transistor switch being connected in series with said relay coil.

7. A turn on current transient limiter as claimed in claim 6 including a diode connected in parallel with said relay coil, and including an inductor connected in series with said plurality of switching circuits connected in parallel.